US009345362B2

(12) United States Patent
Huang et al.

(10) Patent No.: US 9,345,362 B2
(45) Date of Patent: May 24, 2016

(54) TEMPERATURE-CONTROLLABLE GAS GRILL AND THE METHOD OF CONTROLLING TEMPERATURE

(71) Applicant: GRAND MATE CO., LTD., Taichung (TW)

(72) Inventors: Chung-Chin Huang, Taichung (TW); Chin-Ying Huang, Taichung (TW); Hsin-Ming Huang, Taichung (TW); Hsing-Hsiung Huang, Taichung (TW); Kuan-Chou Lin, Taichung (TW); Yen-Jen Yeh, Yunlin (TW)

(73) Assignee: GRAND MATE CO., LTD., Taichung (TW)

( * ) Notice: Subject to any disclaimer, the term of this patent is extended or adjusted under 35 U.S.C. 154(b) by 481 days.

(21) Appl. No.: 13/777,322

(22) Filed: Feb. 26, 2013

(65) Prior Publication Data
US 2014/0037804 A1 Feb. 6, 2014

(30) Foreign Application Priority Data

Aug. 3, 2012 (TW) .............................. 101128026 A
Nov. 12, 2012 (TW) .............................. 101221849 U

(51) Int. Cl.
F23N 1/00 (2006.01)
A47J 37/06 (2006.01)
A47J 27/62 (2006.01)

(52) U.S. Cl.
CPC .............. *A47J 37/06* (2013.01); *A47J 37/0647* (2013.01); *A47J 27/62* (2013.01)

(58) Field of Classification Search
CPC ....... A47J 37/06; A47J 37/0647; A47J 27/62; F23N 1/002; F23N 2037/02; F23N 2037/10; F23N 2035/14
USPC ....................................................... 126/39 G
See application file for complete search history.

(56) References Cited

U.S. PATENT DOCUMENTS

| 6,615,706 B1 * | 9/2003 | Wu ........................ A47J 27/62 99/331 |
| 6,881,055 B2 * | 4/2005 | Bird ........................ F23N 5/022 126/19 M |
| 7,793,649 B2 * | 9/2010 | Barkhouse .............. F23N 1/002 126/19 R |
| 2009/0165778 A1 * | 7/2009 | Harter .................. A47J 37/0713 126/39 G |

* cited by examiner

*Primary Examiner* — Jorge Pereiro
(74) *Attorney, Agent, or Firm* — Ming Chow; Sinorica, LLC

(57) ABSTRACT

A temperature-controllable gas grill includes a base, a cover, a gas valve, several burners, and a temperature controlling device. The cover is provided on the base to form a grilling chamber between the base and the cover. The gas valve is connected to the gas pipe. The burners are provided in the base and are connected to the gas valve. The temperature controlling device includes a gas controller, a temperature sensor, and a main controller. The temperature sensor senses a temperature in the grilling chamber and provides a temperature signal accordingly. The main controller is electrically connected to the temperature sensor to receive the temperature signal. The main controller changes a gas flow supplied to the burners according to the temperature signal to control the temperature in the grilling chamber to control the temperature in the grilling chamber.

10 Claims, 5 Drawing Sheets

TEMPERATURE-CONTROLLABLE GAS GRILL AND THE METHOD OF CONTROLLING TEMPERATURE

The current application claims foreign priorities to the patent applications of Taiwan No. 101128026 filed on Aug. 3, 2012 and Taiwan No. 101221849 filed on Nov. 12, 2012.

BACKGROUND OF THE INVENTION

1. Field of the Invention

The present invention relates generally to a gas stove, and more particularly to a temperature-controllable gas grill and a method of controlling a temperature of the gas grill.

2. Description of the Related Art

FIG. 1 shows a conventional gas grill 100, including a base 110, a cover 112, a gas valve 116, a plurality of control valves 118, and a plurality of burners 120 in the base 110. The cover 112 covers a top of the base 110 to form a grilling chamber 114 thereunder. The gas valve 116 is connected to a gas pipe 124 to turn the gas on or off. The burners 120 and the control valves 118 respectively are connected to the gas pipe 124. Gas is supplied to the burners 120 through the gas valve 116, and the control valves 118 are manipulative to control the burners 120 respectively. Above the burners 120 is a rack 122 where the foods are put thereon. When the cover 112 is opened a user may watch how the food is grilled and control the flames of the burners 120 accordingly by adjusting the control valves 118. However, the user can't see the food when the cover is closed, and he/she only controls the burners 120 by experience so that the user has to repeatedly open the cover 112 to check the food.

SUMMARY OF THE INVENTION

The primary objective of the present invention is to provide a temperature-controllable gas grill, which is able to control the temperature in the grill chamber.

According to the objective of the present invention, the present invention provides a temperature-controllable gas grill, which is connected to a gas pipe, including a base, a cover, a gas valve, at least a burner, and a temperature controlling device. The cover is provided on the base to form a grilling chamber between the base and the cover. The gas valve is connected to the gas pipe. The burner is provided in the base and is connected to the gas valve. The temperature controlling device includes a gas controller, a temperature sensor, and a main controller. The gas controller has a body and a solenoid valve. The body has a first port, a second port, a first passage, and a second passage. The first port is connected to the gas valve; the second port is connected to the burner. The first passage and the second passage respectively connect the first port to the second port. The solenoid valve is provided in the first passage to be controlled to open and close the first passage. The temperature sensor senses a temperature in the grilling chamber and providing a temperature signal accordingly. The main controller is electrically connected to the temperature sensor to receive the temperature signal. The main controller turns the solenoid valve on or off according to the temperature signal to control the temperature in the grilling chamber.

In an embodiment, the present invention provides a method of controlling the temperature in the grilling chamber. The method includes:

monitoring a temperature in the grilling chamber;

comparing the temperature in the grilling chamber with the upper limited temperature and the lower limited temperature, and providing the first gas flow to the gas grill if the temperature in the grilling chamber is lower than the lower limited temperature; or providing the second gas flow to the gas grill if the temperature in the grilling chamber is higher than the upper limited temperature; or alternately providing the first gas flow and the second gas flow to the gas grill if the temperature in the grilling chamber is between the upper limited temperature and the lower limited temperature.

In an embodiment, the present invention provides another method of controlling the temperature in the grilling chamber. The method includes:

monitoring a temperature in the grilling chamber;

comparing the temperature in the grilling chamber with the setting temperature, and providing the first gas flow to the gas grill if the temperature in the grilling chamber is lower than the setting temperature; or providing the second gas flow to the gas grill if the temperature in the grilling chamber is higher than the setting temperature.

Therefore, the present invention may control the temperature in the grilling chamber according to the food therein.

DETAILED DESCRIPTION OF THE INVENTION

The detailed description and technical contents of the present invention will be explained with reference to the accompanying drawings. However, the drawings are illustrative only but not used to limit the present invention.

Figure 1:
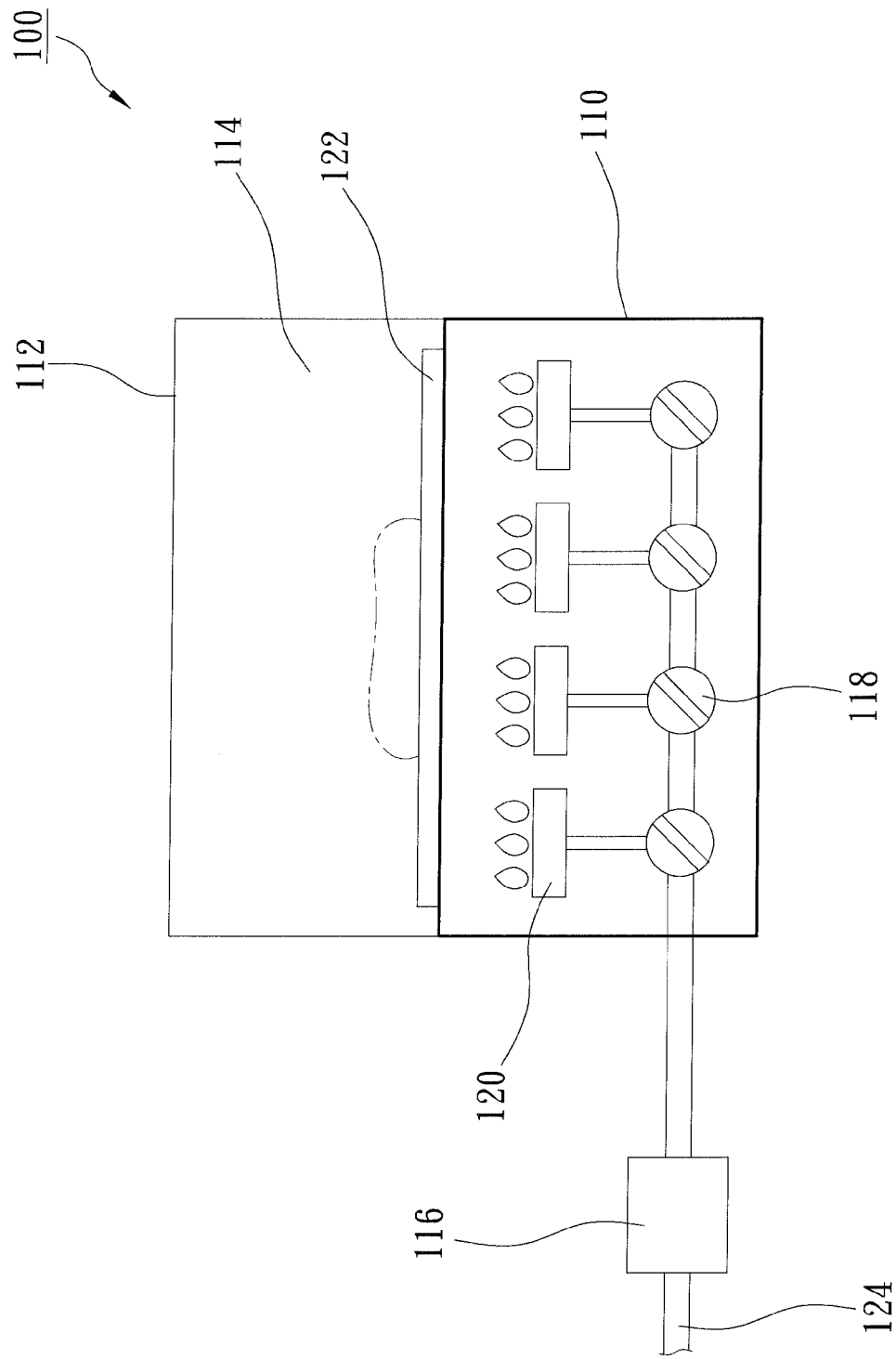
FIG. 1 is a sketch diagram of the conventional gas grill.
Figure 2:
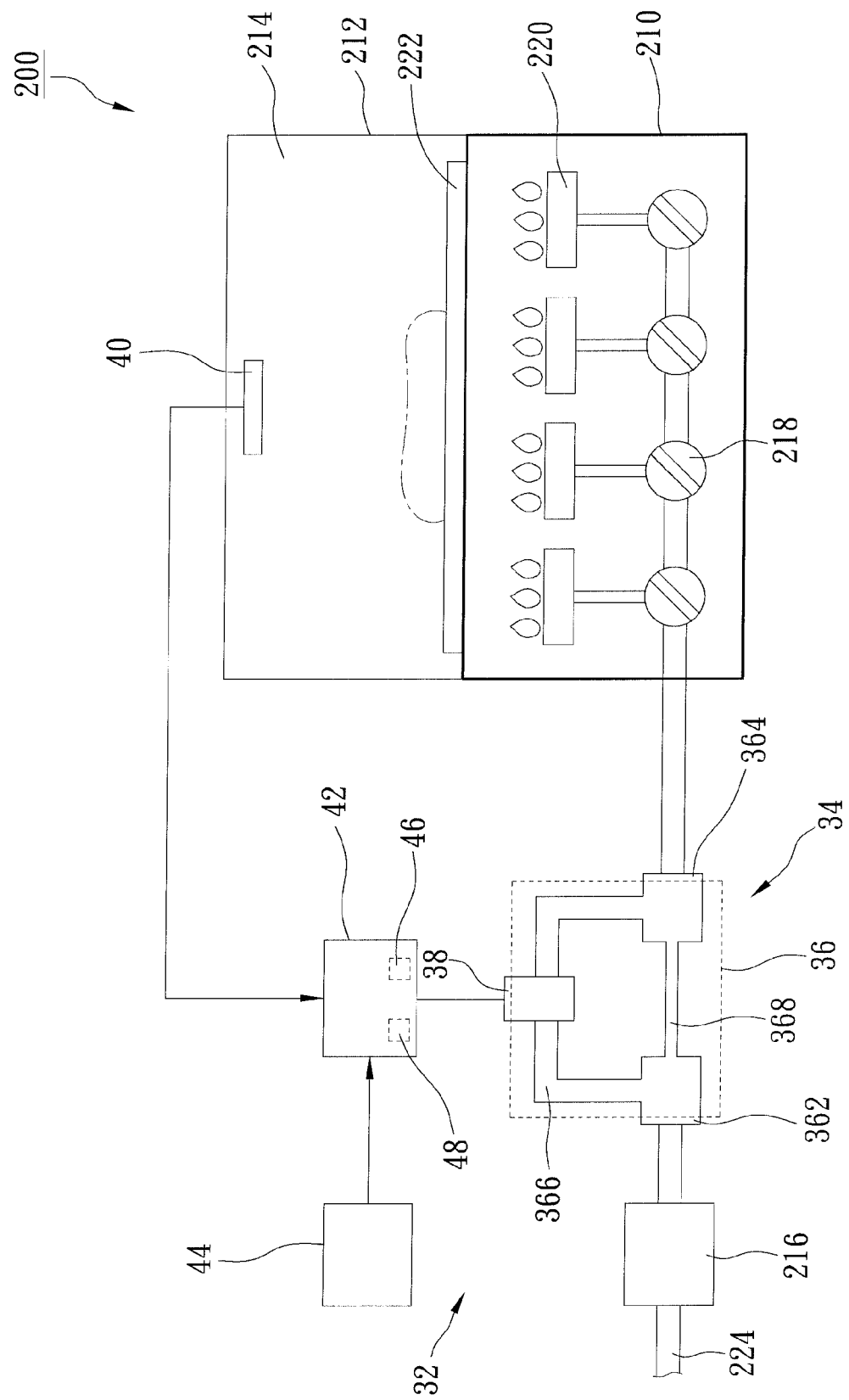
FIG. 2 is a sketch diagram of the gas grill of a preferred embodiment of the present invention.

As shown in FIG. 2, a gas grill 200 of the preferred embodiment of the present invention includes a base 210, a cover 212, a gas valve 216, a plurality of control valves 218, a plurality of burners 220, and a temperature controlling device 32.

The base 210 has a rack 222 on a top thereof for foods to put thereon.

The cover 212 may be put on the top of the base 210 to cover the rack 222. A grilling chamber 214 is formed under the cover 212 when the cover 212 is closed.

The gas valve 216 is connected to a gas pipe 224 to turn gas on or off. The gas valve 216 is connected to the control valves 218 and the burners 220 to supply the burners 220 with gas when the gas valve 216 is turned on.

The control valves 218 are manipulative to control the gas for each burner 220.

The burners 220 are mounted in the base 210 to burn the gas.

The temperature controlling device 32 includes a gas controller 34, a temperature sensor 40 and a main controller 42.

The gas controller 34 has a body 36 and a solenoid valve 38. The body 34 has a first port 362, a second port 364, a first passage 366 and a second passage 368. The gas valve 216 is connected to the first port 362 through a hose so that the gas enters the body 36 through the first port 362. The second port 364 is connected to the first one of the control valves 218. The first passage 366 and the second passage 368 respectively connect the first port 362 to the second port 364. The solenoid valve 38 is mounted in the first passage 366 to open or close the first passage 366. Therefore, the gas flow out of the second port 364 is controllable by switching the solenoid valve 38. The solenoid valve 38 is a normally-open solenoid valve in the present embodiment.

The temperature sensor 40 is a thermocouple in the present invention which is provided in the grilling chamber 214 to sense the temperature in the grilling chamber 214. The temperature sensor 40 is electrically connected to the main controller 42 to send the main controller 42 a temperature signal in association with the temperature in the grilling chamber 214.

The main controller 42 is electrically connected to the solenoid valve 38, and has an input unit 44, a memory unit 46, and a signal generating unit 48.

The input unit 44 is operated by a user to input a setting temperature. The main controller 42 creates a temperature range with an upper limited temperature, which is the highest temperature of the temperature range, and a lower limited temperature, which is the lowest temperature of the temperature range. The main controller 42 turns the solenoid valve 38 on or off the according to the temperature sensed by the temperature sensor 40 in association with the upper and the lower limited temperatures to open or close the first passage 366.

The memory unit 46 is pre-stored with a plurality of reference temperatures, and each reference temperature has a first time and a second time accordingly. The main controller 42 reads the specified reference temperature and the first and the second times in association with the reference temperature in the memory unit 46 according to the setting temperature.

The signal generating unit 48 generates an activating signal and sends it to the solenoid valve 38 to open or close the first passage 366. In an embodiment, when the signal generating unit 48 doesn't send the activating signal to the solenoid valve 38, the solenoid valve 38 opens the first passage 366. At this time, the second port 364 provides a first gas flow which is a sum of gas flows both in the first passage 366 and in the second passage 368. When the signal generating unit 48 sends the activating signal to the solenoid valve 38, the solenoid valve 38 closes the first passage 366. At this time, the second port 364 provides a second gas flow which is identical to a gas flow in the second passage 368 only. It is obviously that the first gas flow is greater than the second gas flow.

When the cover 212 is opened, a user may operate the input unit 44 to turn off the temperature controlling device 32. At this time, the signal generating unit 48 stops to send the activating signal to open the first passage 366 that makes the gas controller 34 to supply the burner 20 with the first gas flow. A user may manually operate the control valves 218 to control the flame.

Figure 3:
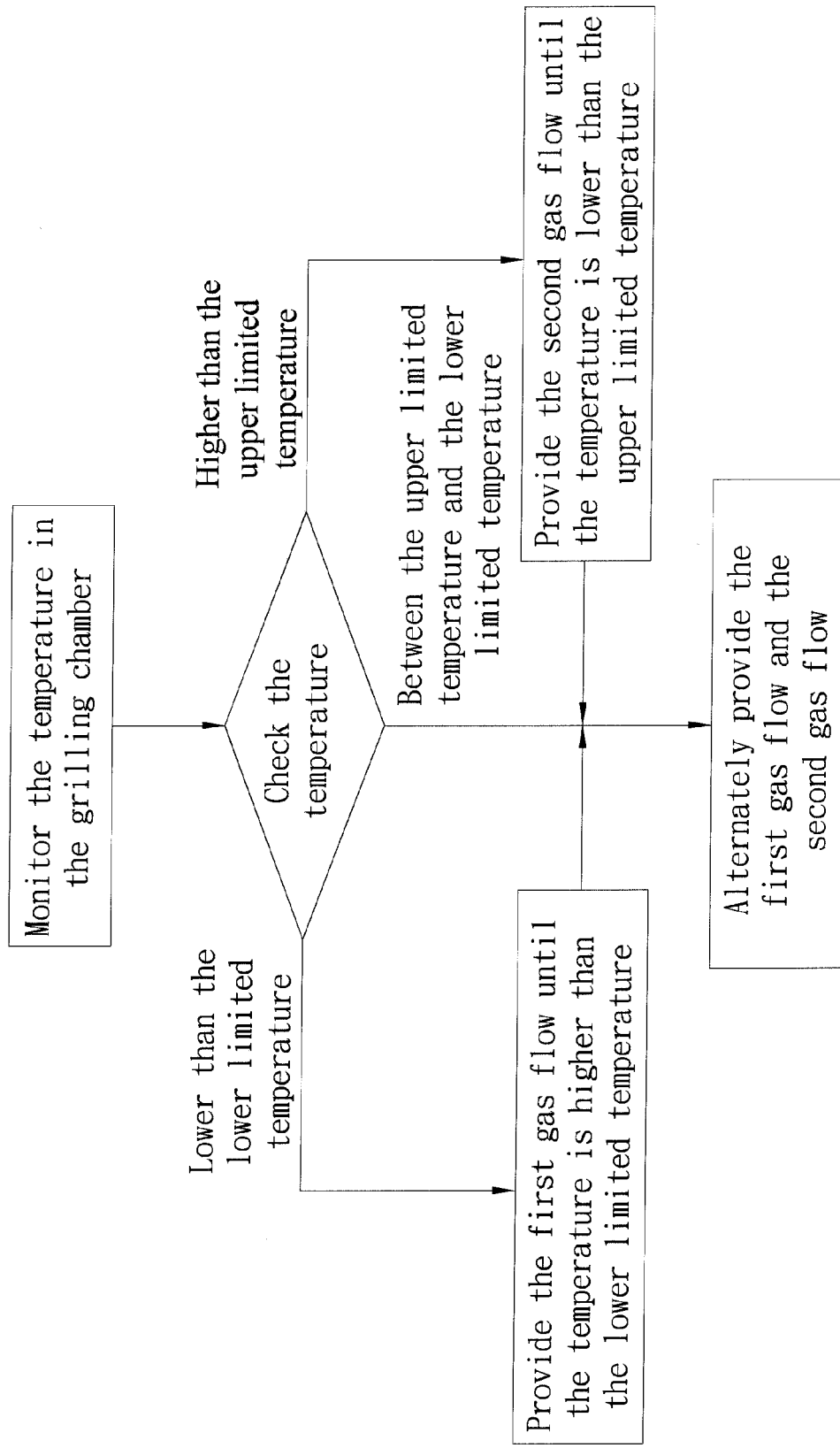
FIG. 3 is a flow chart of the method to control the temperature of the gas grill of the preferred embodiment of the present invention.

When the cover 212 is closed and the user inputs a setting temperature through the input unit 44, the main controller 42 reads the first time and the second time in association with the setting temperature in the memory unit 46. As shown in FIG. 3, a temperature control method will be performed to control the temperature in the grilling chamber 214. The method includes the following steps:

A. Monitoring a temperature in the grilling chamber 214:

The temperature sensor 40 keeps sensing the temperature in the grilling chamber 214, and the sensed result is sent to the main controller 42.

B. Comparing the temperature sensed by the temperature sensor 40 with the upper limited temperature and the lower limited temperature.

If the sensed temperature is lower than the lower limited temperature, the gas controller 34 provides the first gas flow to the gas grill 200. In an embodiment, the signal generating unit 48 stops to send the activating signal to the solenoid valve 38 to turn the solenoid valve 38 on when the sensed temperature is lower than the lower limited temperature. At this time, the first passage 366 is opened and the gas controller 34 provides the first gas flow to the burners 220 to raise the temperature in the grilling chamber 214 until the sensed temperature is higher than the lower limited temperature.

While the sensed temperature is higher than the upper limited temperature, the gas controller 34 provides the second gas flow to the gas grill 200. In an embodiment, the signal generating unit 48 sends the activating signal to the solenoid valve 38 to turn the solenoid valve 38 off when the sensed temperature is higher than the upper limited temperature. At this time, the first passage 366 is closed and the gas controller 34 provides the second gas flow to the burners 220 to lower the temperature in the grilling chamber 214 until the sensed temperature is lower than the upper limited temperature.

While the sensed temperature is between the lower limited temperature and the upper limited temperature, the gas controller 34 alternately provides the first gas flow and the second gas flow to the gas grill 200. In an embodiment, the signal generating unit 48 periodically sends the activating signal to the solenoid valve 38 to repeatedly turn on and turn off the solenoid valve 38 when the sensed temperature is between the lower limited temperature and the upper limited temperature. At this time, the first passage 366 is opened and closed repeatedly to make the gas controller 34 to alternately provide the first gas flow and the second gas flow to the burners 220. This will keep the temperature in the grilling chamber 214 between the lower limited temperature and the upper limited temperature. In an embodiment, the solenoid valve 38 is turned on for the first time, and is turned off for the second time, so that the gas controller 34 alternately provides the first gas flow for the first time and the second gas flow for the second time.

Therefore, the reference temperature, the first time and the second time stored in the memory unit 46 may help the gas controller 34 to keep the temperature in the grilling chamber 214 in the temperature range.

Figure 4:
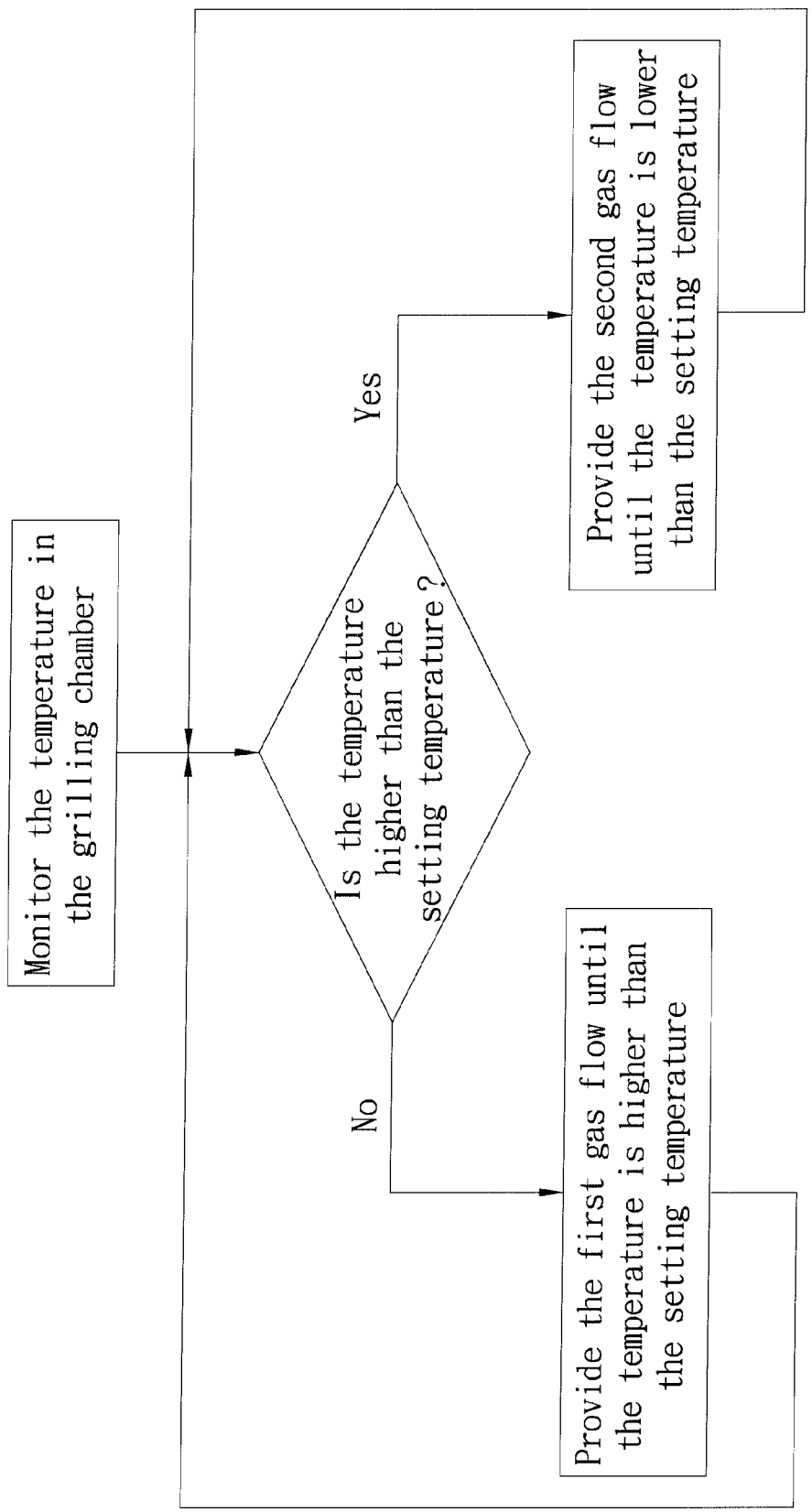
FIG. 4 is a flow chart of another method to control the temperature of the gas grill of the preferred embodiment of the present invention.

As shown in FIG. 4, an alternate method of controlling the temperature in the grilling chamber 214 includes the following steps:

A. Monitoring a temperature in the grilling chamber 214:

B. Comparing the temperature sensed by the temperature sensor 40 with the setting temperature.

If the sensed temperature is lower than the setting temperature, the gas controller 34 provides the first gas flow to the gas grill 200. In an embodiment, the signal generating unit 48 stops to send the activating signal to the solenoid valve 38 to turn on the solenoid valve 38 when the sensed temperature is lower than the setting temperature. At this time, the first passage 366 is opened and the gas controller 34 provides the first gas flow to the burners 220 to raise the temperature in the grilling chamber 214 until the sensed temperature arrives the setting temperature.

While the sensed temperature is higher than the setting temperature, the gas controller 34 provides the second gas flow to the gas grill 200. In an embodiment, the signal generating unit 48 sends the activating signal to the solenoid valve 38 to turn off the solenoid valve 38 when the sensed temperature is higher than the setting temperature. At this time, the first passage 366 is closed and the gas controller 34 provides the second gas flow to the burners 220 to lower the temperature in the grilling chamber 214 until the sensed temperature arrives the setting temperature.

Figure 5:
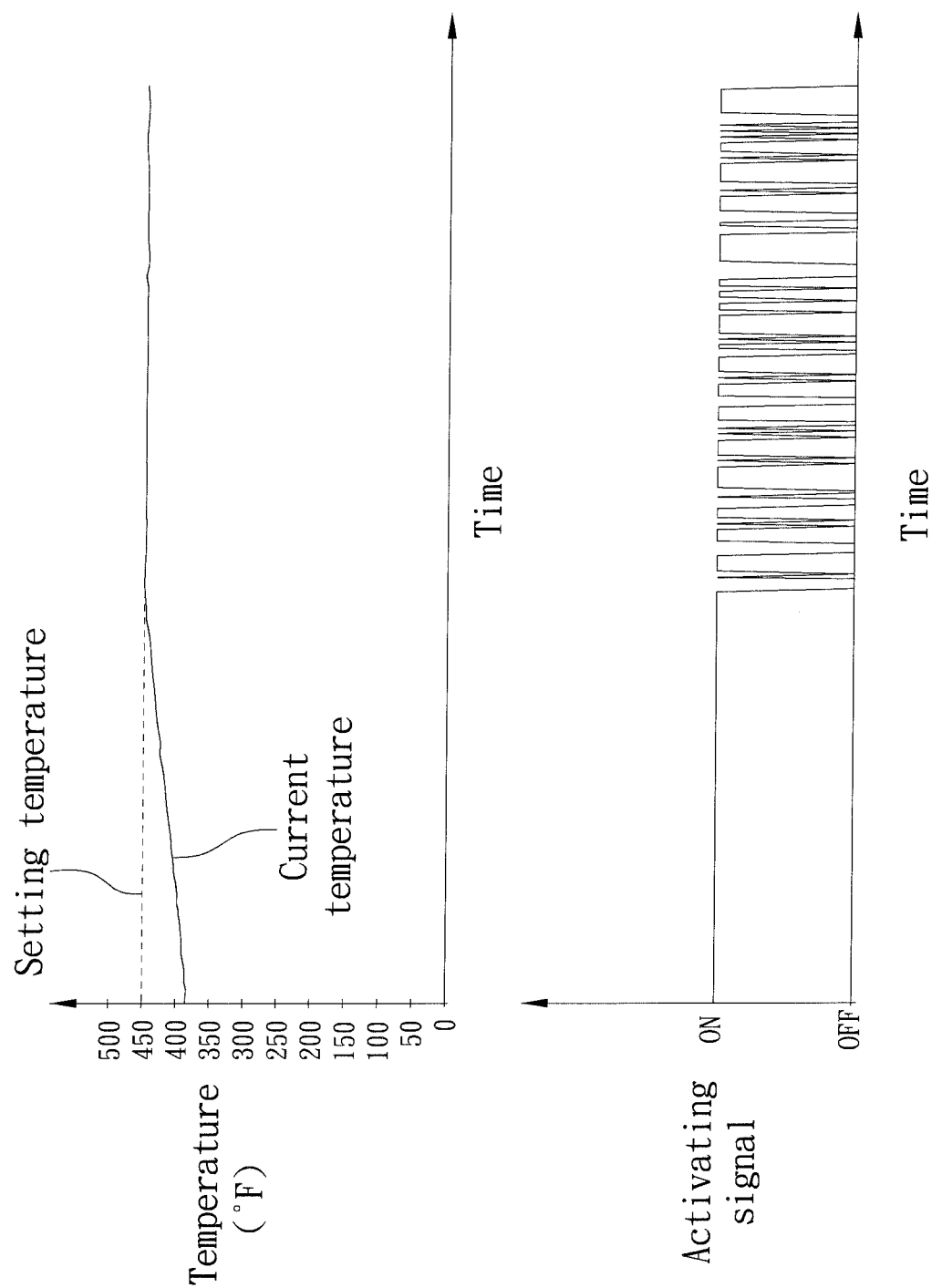
FIG. 5 shows the temperature and the activating signal in the process of temperature control.

FIG. 5 shows the temperature change in the grilling chamber 214 which is controlled by the method as described above. The setting temperature is 450° F. The result shows that the temperature in the grilling chamber 214 is lower than 450° F. in the beginning, and the signal generating unit 48 provides a high level activating signal to make the gas controller 34 to provide the first gas flow so that the temperature raises quickly. While the temperature is higher than 450° F., the signal generating unit 48 provides a low level activating signal to make the gas controller 34 to provide the second gas flow so that the temperature drops. Until the temperature is lower than 450° F., the signal generating unit 48 provides a high level activating signal again to heat up. Above processes are repeated, and the result shows that the temperature in the grilling chamber 214 is kept in a range between 448° F. and 452° F.

With the designs of the present invention, the user may set the temperature in the grilling chamber 214 according to the food in the grilling chamber 214 after he/she closes the cover 212. It will save power for controlling gas flow by the solenoid valve. The solenoid valve may be normally-open type or normally-close type. When use the normally-close type solenoid valve, the first passage 366 is closed when the signal generating unit 48 doesn't send the activating signal, and the first passage 366 is opened when the signal generating unit 48 sends the activating signal to the solenoid valve 38.

In an embodiment, the gas valve 216 has a pilot assembly. The pilot assembly has an outlet beside the burners 220 to burn the gas. In an embodiment, the main controller 42 has a display to show the current temperature in the grilling chamber 214, the setting temperature, and other information. The temperature controlling device 32 has a sensor to sense a temperature of the food. The temperature controlling device 32 is electrically connected to the main controller 42 to show the food's temperature on the display. In an embodiment, the main controller 42 has a timer to control the heating time and an alarm to inform user when time is up.

The description above is a few preferred embodiments of the present invention, and the equivalence of the present invention is still in the scope of claim construction of the present invention.

What is claimed is:

1. A temperature-controllable gas grill, which is connected to a gas pipe, comprising:
    a base;
    a cover provided on the base to form a grilling chamber between the base and the cover;
    a gas valve connected to the gas pipe;
    at least a burner provided in the base and connected to the gas valve; and
    a temperature controlling device including a gas controller, a temperature sensor, and a main controller;
    the gas controller having a body and a solenoid valve, wherein the body has a first port, a second port, a first passage, and a second passage; the first port is connected to the gas valve; the second port is connected to the burner; the first passage and the second passage respectively connect the first port to the second port; the solenoid valve is provided in the first passage to be controlled to open and close the first passage;
    the temperature sensor sensing a temperature in the grilling chamber and providing a temperature signal accordingly;
    the main controller electrically connected to the temperature sensor to receive the temperature signal, wherein the main controller turns the solenoid valve on or off according to the temperature signal to control the temperature in the grilling chamber;
    the main controller has an input unit for a user to input a setting temperature, and the main controller creates an upper limited temperature and a lower limited temperature according to the setting temperature; and
    the main controller has a signal generating unit to periodically provide an activating signal to alternately turn the solenoid valve on and off in order to repeatedly open and close the first passage when the temperature sensed by the temperature sensor is between the lower limited temperature and the upper limited temperature.

2. The temperature-controllable gas grill as defined in claim 1, wherein the main controller turns the solenoid valve on to open the first passage when the temperature sensed by the temperature sensor is lower than the lower limited temperature.

3. The temperature-controllable gas grill as defined in claim 1, wherein the main controller turns the solenoid valve off to close the first passage when the temperature sensed by the temperature sensor is higher than the upper limited temperature.

4. The temperature-controllable gas grill as defined in claim 1, wherein the main controller has a memory unit, in which a plurality of reference temperatures, first times and second times are stored; each of the reference temperatures has one of the first times and one of the second time accordingly; the main controller selects the specified reference temperature according to the setting temperature, and reads the first time and the second time in association with the reference temperature, and then the main controller turns the solenoid valve on for the first time and then turns the solenoid valve off for the second time.

5. The temperature-controllable gas grill as defined in claim 1, wherein the main controller has an input unit for a user to input a setting temperature, and the main controller turns the solenoid valve on when the temperature sensed by the temperature sensor is lower than the setting temperature and turns the solenoid valve off when the temperature sensed by the temperature sensor is higher than the setting temperature.

6. The temperature-controllable gas grill as defined in claim 1, further comprising at least a control valve connected the gas pipe to control gas supplied to the burner.

7. The temperature-controllable gas grill as defined in claim 1, further comprising a pilot assembly, which has an outlet beside the burner to burn gas of the burner.

8. The temperature-controllable gas grill as defined in claim 1, wherein the main controller has a display to show the temperature in the grilling chamber.

9. The temperature-controllable gas grill as defined in claim 1, wherein the temperature controlling device has a sensor to sense a temperature of a food in the grilling chamber, and the main controller has a display to show the food's temperature sensed by the sensor.

10. The temperature-controllable gas grill as defined in claim 1, wherein the main controller has a timer and an alarm to inform a user when the time is up.

* * * * *